United States Patent Office 3,741,850
Patented June 26, 1973

3,741,850
PLASTICS WEB SLITTING AND SEALING DEVICE
Peter Edward Highfield and Gordon John Hill, Stevenage, England, assignors to British Visqueen Limited, London, England
Filed Aug. 20, 1970, Ser. No. 65,582
Claims priority, application Great Britain, Sept. 8, 1969, 44,343/69
Int. Cl. B32b 31/00
U.S. Cl. 156—515
6 Claims

ABSTRACT OF THE DISCLOSURE

A device for simultaneously slitting and edge sealing a plastics web, comprising a resistance heater in the form of a flat, elongated blade attached at its ends to a pair of conductors and provided with a projection of a longer edge which, in operation, projects through the path of the web and serves to cut and seal the web, the blade width being reduced in the vicinity of the projection, characterised in that the contour of the blade and its position of attachment to the conductors are such that the neutral line of tension lies wholly within the material of the blade.

---

Figure 1:
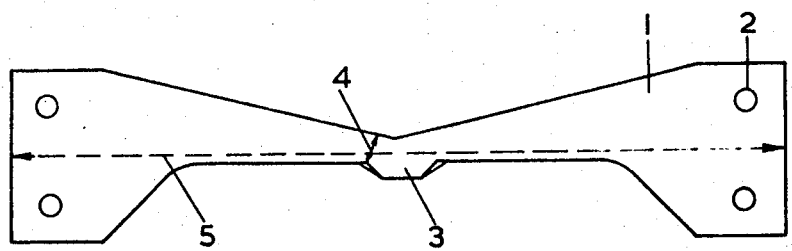

This invention relates to a device for slitting and heat sealing plastics webs.

In simultaneously slitting and edge sealing plastics webs comprising two or more layers, generally of plastics films, it is known to pass the web round a rotating roller and to slit and heat seal the web longitudinally by means of a flat blade having a heated substantially V-shaped edge or projection of its edge, the other edge of the blade being cut away within the V; the V-shaped projection projects into a circumferential slot on the roller with the arms of the V in a plane at right angles and perpendicular to the axis of the roller. The device may also be used for slitting single layer webs of plastics materials, for example to prevent fraying of the cut edges of woven fabrics, or to form edge beads to strengthen the cut edges of slit film. The flat blade of this known device is made of a material of high resistivity, such as a high resistance alloy, is heated by passing a low voltage electric current through it, and is shaped so that it reaches its smallest cross-section at the apex of the V; the heat is thus concentrated at this point. For the heat sealing and slitting process, the apex of the blade is generally heated to a temperature sufficiently high for the film to be melted and to shrink away from the blade at its first contact with the blade or even before it actually comes into contact with the blade.

In our copending application Ser. No. 65,584, filed Aug. 20, 1970, now abandoned, we have described an improvement in this known slit-sealing blade, consisting in that, while a projection is still provided for slitting the web, the blade reaches its smallest cross-sectional area in advance of the apex of the projection, in relation to the travelling of the web, preferably substantially at a point at which the projection may intersect the path of the web, so that heat may be concentrated at or about the point a which the blade first contacts the web.

We have further found that such slit-sealing blades, which in use are attached by their opposite ends under longitudinal tension to a pair of conductors of low resistivity, will give a more uniform heat seal along the cut edges if the neutral line of tension of the blade lies wholly within the body of the blade, instead of crossing a cut-away part or parts of the blade as is the case with blades previously known in the art.

By the term "neutral line of tension" we mean the line through the ends of the blade about which the strains resulting from the attachment of the blade at its two ends, under longitudinal tension, are balanced.

In accordance with the present invention, therefore, a heat sealing device for simultaneously slitting a continuously advancing plastics web and sealing the slit edges, and comprising a pair of conductors between which is attached by its opposite ends, under longitudinal tension, a resistance heating element in the form of a substantially flat, elongated blade provided on one of its longer sides with a projecting edge portion so shaped that it may, with its leading edge, intersect the path of the advancing web when the blade is held perpendicular thereto and with its flat faces parallel with the direction of travel of the web, the blade being cut away behind the projection so as to have its smallest cross-sectional area in the vicinity of the projection, is characterized in that the contour of the blade and the position of its attachment to the conductors are such that the neutral line of tension lies wholly within the body of the blade.

In accordance with a further feature of the invention, a resistance heating element for use in the heat sealing device comprises a blade as described, so contoured and provided at its two ends with slots or apertures for attachment to the pair of conductors in such position that the neutral line of tension lies wholly in the body of the blade.

One preferred form of the device of the invention will now be described by way of example with reference to the accompanying drawings, of which:

FIG. 1 is a side view of a slit-sealer blade for use in the device; and

Figure 2:
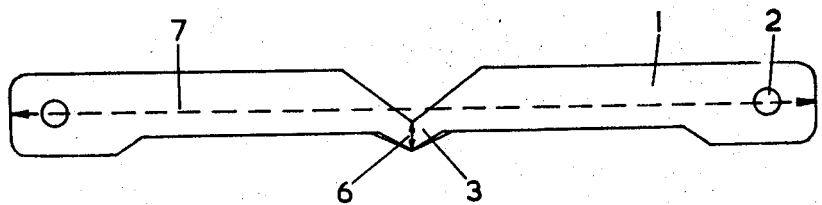

FIG. 2, provided for comparison, is a side view of a known type of slit-sealer blade for use in the same operation.

In FIG. 1: 1 is the flat blade, apertured, as at 2, for attachment at its opposite ends to a pair of conductors of low resistivity, through which electric current may be supplied. The blade is provided with a projection 3, and is cut away at its upper edge so that it has its smallest cross-sectional area at 4. 5 is the neutral line of tension about which the strains are balanced when the blade is attached under longitudinal tension to the conductors; it will be seen that this line lies wholly within the material of the blade.

In FIG. 2, the part of the blade of smallest cross-sectional area is indicated at 6, and the neutral line of tension at 7, other reference numbers being as for FIG. 1. It will be seen that in this case the neutral line of tension crosses the cut-out portion behind the projection 3.

The shape of the projection 3 of FIG. 1 and the position of the smallest cross-sectional area of the blade are such that the blade reaches its smallest cross-sectional area substantially at the point at which the blade intersects the path of the web, as preferred in our copending application Ser. No. 65,584, filed Aug. 20, 1970, now abandoned, mentioned hereinbefore. An arrangement as described and claimed in that application is preferred in the device of the present invention. However, the blade may have its smallest cross-sectional area at the apex of the projection, provided that the blade is suitably contoured and arranged for attachment to the conductors in the manner hereinbefore described.

We have found that the device of the present invention gives a neat and uniform edge bead along the slit edges more consistently than has been the case with the previously known slit-sealing elements of this type. Seals provided to slit and join together the adjacent slit edges of a double layer of plastics film, in particular, have been found to be of greater and more uniform strength than have often been obtained with the previously known blades.

The device of the invention may be used for any of the slit-sealing operations mentioned hereinbefore. It is particularly useful for slitting webs comprising two or more layers of plastics films and simultaneously sealing together the pairs of adjacent cut edges. This method is used, for example, for longitudinally dividing flattened tubular films into two or more sections, and for plastics bag manufacture.

We claim:

1. A heat sealing device for simultaneously slitting a continuously advancing plastics web and sealing the slit edges and comprising a pair of conductors between which is attached by its opposite ends, under longitudinal tension, a resistance heating element in the form of a substantially flat, elongated blade provided on one of its longer sides with a projecting edge portion so shaped that it may, with its leading edge, intersect the path of the advancing web when the blade is held perpendicular thereto and with its flat faces parallel with the direction of travel of the web, the blade being cut away behind the projection so as to have its smallest cross-sectional area in the vicinity of the projection, characterized in that the contour of the blade and the position of its attachment to the conductors are such that the neutral line of tension lies wholly within the body of the blade.

2. A device as claimed in claim 1 in which the blade reaches its smallest cross-sectional area in advance of the apex of the projection, in relation to the travelling of the web.

3. A device as claimed in claim 2 in which the blade reaches its smallest cross-sectional area substantially at a point at which the projection may intersect the path of the web.

4. A resistance heating element for use in a device as claimed in claim 1, having the form of a substantially flat, elongated blade provided on one of its longer sides with a projecting edge portion so shaped that it may intersect the path of a continuously advancing web when the blade is held perpendicular thereto and with its flat faces parallel with the direction of travel of the web, the blade being cut away behind the projection so as to have its smallest cross-sectional area in the vicinity of the projection, and being apertured at its two ends of attachment to the pair of conductors, characterized in that the contour of the blade and the positions of the apertures are such that the neutral line of tension, as hereinbefore defined, lies wholly within the body of the blade.

5. A resistance heating element as claimed in claim 4 in which the blade reaches its smallest cross-sectional area in advance of the apex of the projection, in relation to the travelling of the web.

6. A resistance heating element as claimed in claim 5 in which the blade reaches its smallest cross-sectional area substantially at a point at which the projection may intersect the path of the web.

References Cited

UNITED STATES PATENTS 3,263,540   8/1966   Lefevere _____ 83—171

DOUGLAS J. DRUMMOND, Primary Examiner

U.S. Cl. X.R.

83—171